April 2, 1940.   R. H. SCHMITT   2,196,032
SCREW THREADED FASTENING
Filed May 17, 1938
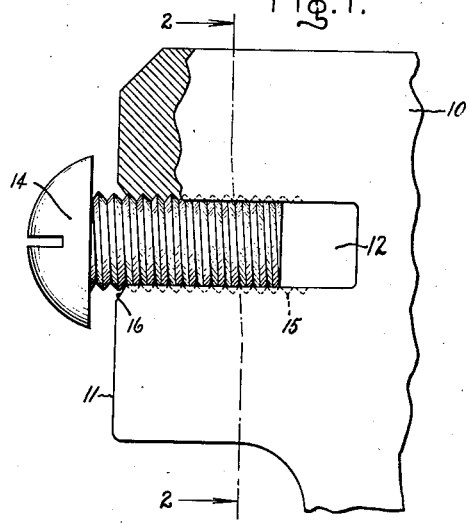
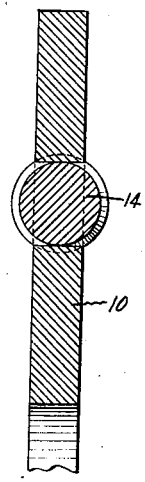
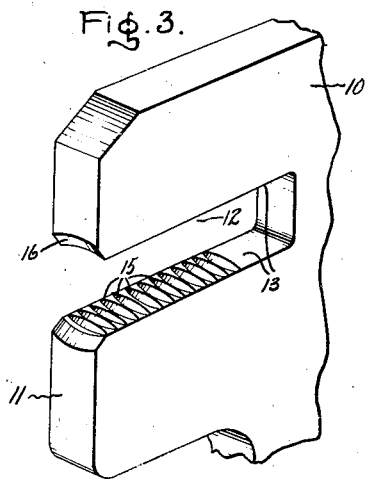
Inventor:
Richard H. Schmitt,
by Harry E. Dunham
His Attorney.

Patented Apr. 2, 1940

2,196,032

UNITED STATES PATENT OFFICE 2,196,032

SCREW THREADED FASTENING

Richard H. Schmitt, Schenectady, N. Y., assignor to General Electric Company, a corporation of New York Application May 17, 1938, Serial No. 208,386

3 Claims. (Cl. 85—1)

My invention relates to screw threaded fastenings, more particularly to screw threaded fastenings for plates, and has for an object the provision of a fastening for receiving threaded screw members of common sizes in edgewise relation to the plate where the screw member has a diameter greater than the plate.

A further object of my invention is the provision of a screw threaded fastening of this character which is simple and inexpensive to manufacture.

Heretofore, where the edge of a thin plate was required to abut and be fastened to another plate or member, it has been the practice to put flanges or projections on one of the plates which extended parallel to the surface of the co-operating plate. These flanges or projections might be parts separate from the plate which were attached by such means as bolting and soldering or at other times might be formed by bending the edge of the plate in a suitable manner. Additional means, such as bolts and nuts, were then used to fasten the plates together after the necessary bolt holes were aligned and drilled. The inherent expense of additional steps in fabricating articles, such as casings for electrical controls and metal enclosures of various kinds made from thin plates, is obvious, and my invention contemplates the provision of a screw threaded fastening directly in the body of a thin plate which may be made quickly and inexpensively in production quantities.

Accordingly, at the same time the plates of given sizes are punched from large sheets of plate material which may be a metal, such as steel, bronze or a non-metallic composition, I prefer to punch slots in the plates extending inwardly from the edges thereof. It is obvious, however, that the punching of the slots need not be made during the single operation at which time the plates themselves are punched out, although combining the punching operations in one step is generally less expensive. The slot punchings, of course, are made at those points on the edge of the plate where a fastening means is desired. After the slots are formed, the plate may be removed to a jig and the slot tapped or threaded by a threading tap in a drill press.

For a more complete understanding of my invention, reference should be had to the accompanying drawing in which Fig. 1 is an elevational view of a thin plate partly in section having a threaded fastening embodying my invention; Fig. 2 is a side view of a section of Fig. 1 taken on the line 2—2; and Fig. 3 is a perspective view of Fig. 1 with the threaded screw removed.

Referring to the drawing, I have shown my invention in one form as applied to a screw threaded fastening in a thin plate adapted to receive a threaded bolt. A section of a plate 10 having an edge 11 is provided with a substantially rectangular slot 12 extending into the body of the plate 10 from its edge 11. By punching directly through the thin plate 10, the side walls 13 of the slot 12 are formed perpendicularly to the surface of the plate 10 and spaced apart such a distance as to be ready for tapping or threading. Obviously, the slot 12 could be formed by sawing or milling a portion of the plate away, but I prefer to use punching, since a punching operation is less expensive in quantity production.

To tap the walls 13 in the slot 12 so that a threaded screw 14 may be turned into and toward the main body of the plate 10 in an edgewise relation to the plate between the walls 13, it may be necessary, depending upon the plate material used, to support the plate in a jig for avoiding distortion of the thin walls 13 during tapping. After tapping, the walls 13 of the plate 10 carry the partial transverse threads or thread indentations 15 running across the thickness of the plate 10, and formed about a common axis which is the longitudinal center line of the slot equidistant from the walls 13 and also equidistant from the planes of the surfaces of the plate 10. I prefer to countersink the outer edges of the slot 12 (shown at 16) to facilitate the starting of the threaded bolt 14 when it is screwed into the slot 10.

My invention is applicable to any thin plate material which can be punched and is specifically intended to permit the use of bolts of commercial size whose diameter is larger than the thickness of the plate sought to be fastened, the bolt being screwed into the plate in an edgewise relation thereto. For instance, I have been able to fabricate suitable fastenings in bronze plates $\frac{1}{16}$ of an inch in thickness using a number 10 bolt which is .192 inch in diameter.

By punching the slots in the plates slightly undersize compared to diameter the bolts intended to be used and tapping the undersized slots with an appropriate number of threads for the given size bolts, it is possible to dispense with lock washers on the bolts. The sides of the slot exert a compression force which grips the bolt and holds it firmly in place.

As hereinbefore explained, it has previously been assumed necessary to bend over the edges of the plates or add extensions or additional means thereto to provide what was believed the only suitable threaded fastening for thin plates secured edgewise. By my invention, I have provided a threaded fastening which not only permits the use of screws or threaded bolts of commercial sizes, but also a fastening having sufficient structural strength for ordinary uses which saves the expense of nuts, washers, plate additions and reduces manufacturing costs.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States is:

1. A plate provided with a threaded fastening for receiving a threaded bolt whose diameter is greater than the thickness of said plate, said threaded fastening comprising a pair of spaced apart opposite walls in said plate each of which is substantially perpendicular to the surfaces of said plate defining a slot extending through said plate and from an edge of said plate into the body thereof, the longitudinal boundary of said slot being solely said opposite walls in said plate, and transverse screw threads in said walls having a common axis positioned substantially midway between said walls and substantially midway between the planes of the surfaces of said plate whereby the bolt is normally secured to said plate by screwing it into said slot from said edge of said plate.

2. A plate provided with a threaded fastening for receiving a threaded bolt whose diameter is greater than the thickness of said plate, said threaded fastening comprising an end wall and a pair of spaced apart opposite walls in said plate, said opposite walls being respectively parallel to each other and perpendicular to the surfaces of said plate defining a substantially rectangular slot extending through said plate and from an edge of said plate in edgewise relation thereto into the body thereof, said slot being defined solely by said opposite walls and said end wall in said plate, and transverse screw threads on said opposite walls to engage a threaded bolt adapted to be screwed therebetween from said edge of said plate, the common axial center line of said threads lying midway between the planes of said surfaces of said plate.

3. A plate provided with a threaded fastening for receiving in edgewise relation to said plate a threaded bolt whose diameter is substantially greater than the thickness of said plate, said threaded fastening comprising a pair of parallel spaced-apart opposite walls whose surfaces are substantially perpendicular to the surfaces of said plate and define a rectangular slot extending through said plate from one of said surfaces to the other and from one edge of said plate into the body thereof, and screw threads in said oppositely disposed walls of said slot and extending transversely with respect to the surfaces of said plate for receiving in threaded relation the bolt, said threads in each of said walls being formed with a common axial center line substantially equidistant from the planes of the surfaces of said plate and also substantially equidistant from said walls of said slot whereby the bolt is normally secured to said plate by screwing it into the body of said plate from said one edge thereof and has its axial center line lying equidistant from the planes of said surfaces of said plate.

RICHARD H. SCHMITT.